(12) United States Patent
Cho et al.

(10) Patent No.: US 8,184,257 B2
(45) Date of Patent: May 22, 2012

(54) LIQUID CRYSTAL DISPLAY AND METHOD FOR MANUFACTURING THE SAME

(75) Inventors: Jun Beom Cho, Anseong-si (KR); Hyeon Jin Seo, Gumi-si (KR); Jeong Hoon Lee, Gumi-si (KR); Dhang Kwon, Daejeon-si (KR); Hang Sup Cho, Gumi-si (KR); Ho Su Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 192 days.

(21) Appl. No.: 12/209,639

(22) Filed: Sep. 12, 2008

(65) Prior Publication Data
US 2009/0091677 A1 Apr. 9, 2009

(30) Foreign Application Priority Data
Oct. 5, 2007 (KR) .................. 10-2007-0100349

(51) Int. Cl.
*G02F 1/1339* (2006.01)
(52) U.S. Cl. .......................... 349/156; 349/155
(58) Field of Classification Search .................. 349/155, 349/156
See application file for complete search history.

(56) References Cited

U.S. PATENT DOCUMENTS

| | | | |
|---|---|---|---|
| 7,492,435 B2 * | 2/2009 | Jeon | 349/155 |
| 7,501,163 B2 * | 3/2009 | Kim | 428/1.1 |
| 7,630,042 B2 * | 12/2009 | Yoon | 349/129 |
| 7,701,545 B2 * | 4/2010 | Niiya | 349/155 |
| 2003/0128311 A1 * | 7/2003 | Tsuda et al. | 349/106 |
| 2004/0125319 A1 * | 7/2004 | Lim et al. | 349/156 |
| 2005/0122446 A1 * | 6/2005 | Jeon | 349/110 |
| 2007/0002237 A1 * | 1/2007 | Yoon | 349/129 |
| 2007/0122566 A1 * | 5/2007 | Kim | 428/1.5 |
| 2007/0146618 A1 * | 6/2007 | Hashimoto | 349/155 |
| 2007/0263165 A1 * | 11/2007 | Sung et al. | 349/187 |
| 2008/0283175 A1 * | 11/2008 | Hagood et al. | 156/145 |
| 2009/0009709 A1 * | 1/2009 | Niiya | 349/156 |
| 2009/0103039 A1 * | 4/2009 | Satoh | 349/155 |
| 2009/0122241 A1 * | 5/2009 | Satoh | 349/106 |

* cited by examiner

*Primary Examiner* — K. Cyrus Kianni
(74) *Attorney, Agent, or Firm* — Brinks Hofer Gilson & Lione (57) ABSTRACT

Disclosed herein are a liquid crystal display (LCD) device and a method for manufacturing the same, capable of preventing problems (i.e., movement of balls, damage to the surfaces that face spacers upon application of predetermined pressure, and variation in cell gap) associated with the use of the ball spacers. The liquid crystal display device includes a first substrate and a second substrate facing each other, a spacer formed on the first substrate, wherein the spacer includes a plurality of balls and a solid to aggregate the balls together and adhere the balls to the first substrate, a hard coating layer formed on the second substrate facing the spacer, and a liquid crystal layer filled between the first substrate and the second substrate.

1 Claim, 7 Drawing Sheets

RELATED ART

LIQUID CRYSTAL DISPLAY AND METHOD FOR MANUFACTURING THE SAME

This application claims the benefit of Korean Patent Application No. 2007-100349, filed on Oct. 5, 2007, which is hereby incorporated by reference as if fully set forth herein.

BACKGROUND OF THE INVENTION

1. Field of the Invention

The present invention relates to a liquid crystal display (LCD) device. More particularly, the present invention relates to a liquid crystal display (LCD) device and a method for manufacturing the same, capable of preventing problems (i.e., movement of balls, damage to the surfaces that face spacers upon application of predetermined pressure, and variation in cell gap) associated with the use of the ball spacers.

2. Discussion of the Related Art

With the progress of an information-dependent society, the demand for various display devices has increased. To meet such a demand, efforts have recently been made to research flat panel display devices such as liquid crystal displays (LCDs), plasma display panels (PDPs), electro-luminescent displays (ELDs) and vacuum fluorescent displays (VFDs). Some types of such flat panel displays are being practically applied to various appliances for display purposes.

Of these, LCDs are currently most widely used as substitutes for cathode ray tubes (CRTs) in association with mobile image display devices because LCDs have the advantages of superior picture quality, lightness, slimness, and low power consumption. Various applications of LCDs are being developed in association with not only mobile image display devices such as monitors of notebook computers, but also monitors of TVs to receive and display broadcast signals, and monitors of laptop computers.

Successful application of such LCDs to diverse image display devices depends on whether or not the LCDs can realize desired high picture quality including high resolution, high brightness, large display area, and the like, while maintaining desired characteristics of lightness, slimness and low power consumption.

Hereinafter, a conventional LCD device will be described with reference to the annexed drawings.

Figure 1:
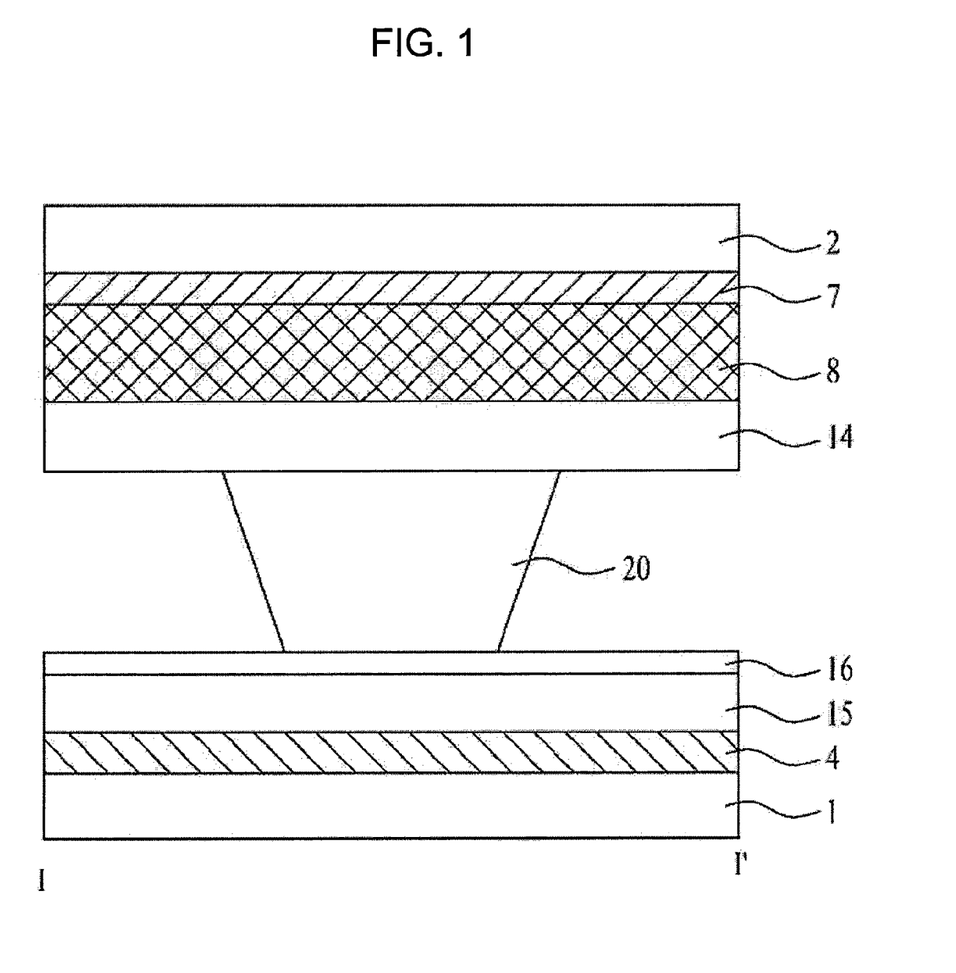
FIG. 1 is a sectional view illustrating a conventional liquid crystal display device.

FIG. 1 is a sectional view illustrating a conventional LCD device.

The conventional LCD device comprises a first substrate 1 and a second substrate 2 that face each other, a liquid crystal layer (not shown) filled between the first substrate 1 and the second substrate 2 and a column spacer 20 to maintain the thickness of the liquid crystal layer.

The column spacer 20 is arranged in a region provided above a gate line 4. That is, the gate line 4 is arranged on the first substrate 1, a gate insulating film 15 is arranged over the entire surface of the first substrate 1 including the gate line 4, and a passivation film 16 is arranged on the gate insulating film 15.

A black matrix layer 7 is formed on the second substrate 2 to shield non-pixel regions (i.e., portions where gate and data lines, and thin film transistors are formed) other than pixel regions. In addition, a color filter layer, comprising R, G and B color filters arranged at respective pixel regions, is formed on the second substrate 2 including the black matrix layer 7. A common electrode 14 is formed over the entire surface of the second substrate 2 including the color filter layer 8.

The column spacer 20 is formed on the common electrode 14 in a region corresponding to the gate line 4. Accordingly, the first and second substrates 1 and 2 are joined together such that the column spacer 20 is arranged above the gate line 4.

The column spacer 20 is formed in an array process performed on the first substrate 1 or the second substrate 2. The column spacer 20 is fixedly formed in the form of a column with a certain height on the predetermined substrate.

The column spacer 20 is fixed in a specific position. Accordingly, it is advantageous that the column spacer 20 does not move and thus has no negative effect on the flow of liquid crystals, when the liquid crystals are dropped for the formation of the liquid crystal layer. However, the column spacer has a large area in contact with the corresponding substrate, thus disadvantageously causing display defects, e.g., touch defects.

SUMMARY OF THE INVENTION

A liquid crystal display device comprises: a first substrate and a second substrate facing each other; a spacer formed on the first substrate, wherein the spacer comprises a plurality of balls and a solid to aggregate the balls together and adhere the balls to the first substrate; a hard coating layer formed on the second substrate facing the spacer; and a liquid crystal layer filled between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, an LCD device and a method for manufacturing the same according to the present invention will be described with reference to the annexed drawings.

Figure 2:
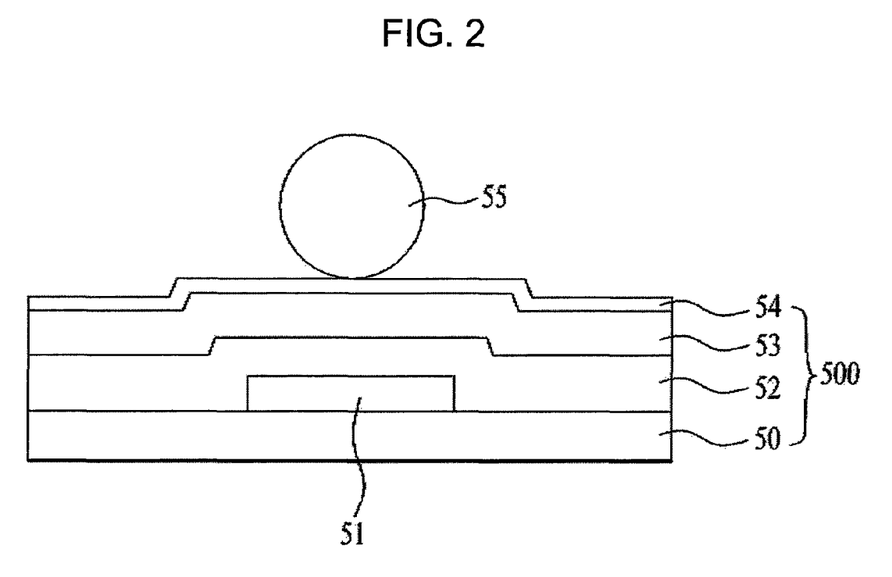
FIG. 2 is a sectional view illustrating a liquid crystal display device comprising a ball spacer.

FIG. 2 is a sectional view illustrating a liquid crystal display device comprising a ball spacer.

As shown in FIG. 2, in the liquid crystal display device using the ball spacer, a ball spacer 55 is arranged on the outermost surface of a color filter array 500 which comprises a black matrix layer 51, a color filter layer 52, an overcoat layer 53 and an alignment film 54 arranged on a second substrate 50 in this order.

Recently, methods in which the ball spacer 55 is dotted through an ink-jetting technique in a desired position have been suggested. In accordance with these methods, after the ball spacer 55 is formed in the desired position, it often moves from the initial position due to external force applied during the formation process or an impact applied in use. Accordingly, efforts have been made to fix the ball spacer 55 in the desired portion.

Figure 3:
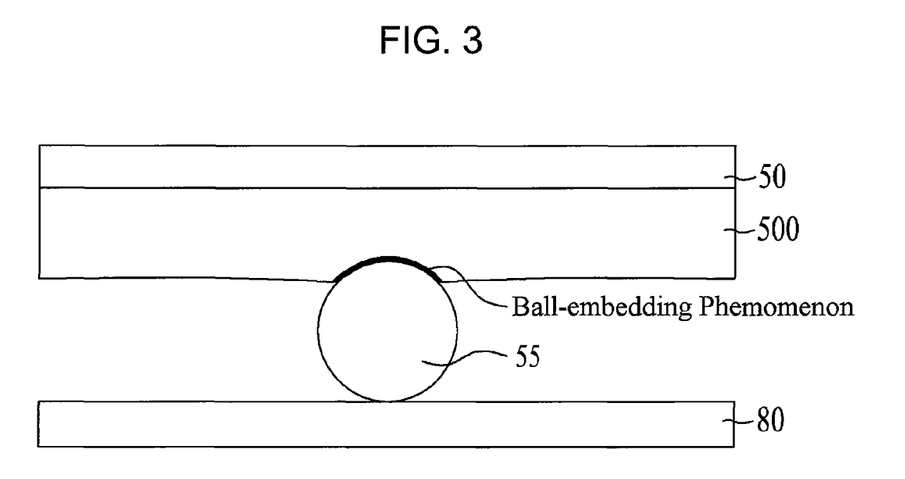
FIG. 3 is a sectional view illustrating a phenomenon in which a ball spacer is embedded in the substrate surface facing the spacer, when the ball spacer is used.

FIG. 3 is a sectional view illustrating a phenomenon in which, when a ball spacer is used, the ball spacer is embedded in the substrate surface that faces the spacer.

As shown in FIG. 3, in a case where the ball spacer 55 is formed on the second substrate 80 which faces the first substrate 50 provided with the color filter array 500, when the ball spacer 55 is fixed on the second substrate 80, a phenomenon, so-called "ball-embedding defect", in which the ball spacer 55 is lodged in the upper surface of the color filter array 500 which faces the ball spacer 55, because it is harder than the color filter array 500, occurs inside the first substrate 50 and the second substrate 80, upon application of predetermined pressure to join the first substrate 50 to the second substrate 80.

In this case, a decrease in cell gap comparable to the thickness, at which the ball spacer 55 is embedded, occurs. As a result, the ball spacer 55 exhibits optical effects different from the panel having a normal cell gap due to a decreased liquid crystal amount. Accordingly, the panel where the ball-embedding defects occur may be considered defective. In addition, when the ball spacer 55 is embedded in the color filter array 500 that faces the ball spacer 55, an area in which the ball spacer 55 comes in contact with the color filter array 500 is greatly increased, and the ball spacer 55 cannot exhibit superior contact area decrease effects, as compared to conventional column spacers. Upon touch operation, in which the first substrate or the second substrate 80 is pushed in one direction, the frictional force is increased and the risk of touch defects is thus increased. As a consequence, the liquid crystal margin (defined as the range of a liquid crystal dropping amount at which gravity and touch defects do not occur) of the ball spacer 55 is lower than that of a structure free from ball-embedding defects.

An example where the ball spacer 55 is formed on the second substrate 80 is illustrated in FIG. 3. If necessary, the ball spacer 55 may be formed on the first substrate 50 provided with the color filter array 500, and thus come in contact with a thin film transistor array arranged on the first substrate 50. In this case, the outermost film of the thin film transistor array may include an organic or inorganic insulating film, like a passivation film. The ball-embedding phenomenon shown in FIG. 3 may occur in the organic or inorganic insulating film that comes in contact with the ball spacer. As a result, the afore-mentioned problems may occur.

Accordingly, a liquid crystal display device and a method for manufacturing the same capable of solving the ball-embedding problem, based on structural approaches, will be illustrated in detail with reference to the annexed drawings.

Figure 4:
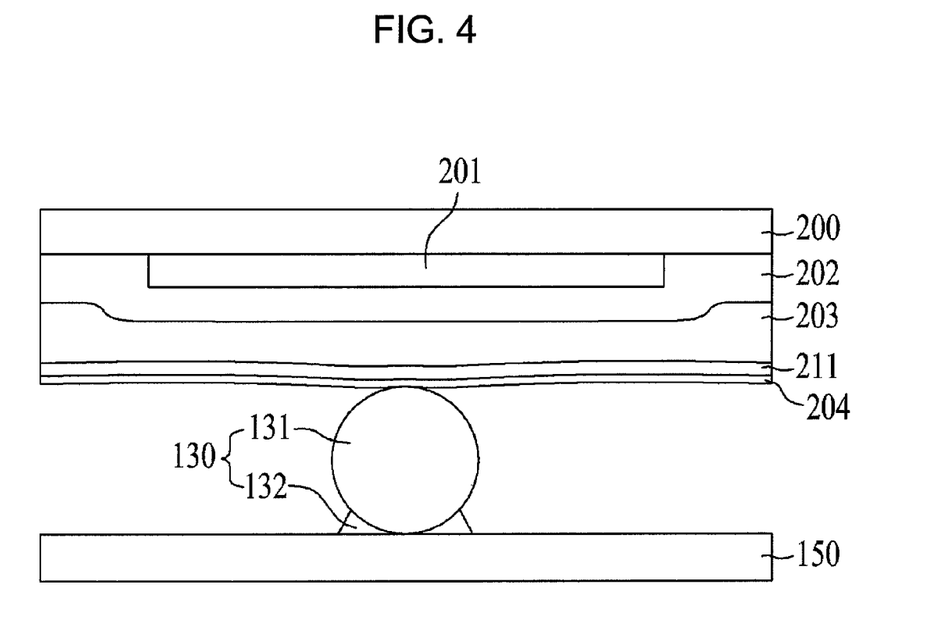
FIG. 4 is a sectional view illustrating a liquid crystal display device according to a first embodiment of the present invention.

FIG. 4 is a sectional view illustrating a liquid crystal display device according to a first embodiment of the present invention.

As shown in FIG. 4, the liquid crystal display device according to the first embodiment of the present invention comprises: a thin film transistor array substrate 150, and a second substrate 200 comprising a color filter array that face each other; a liquid crystal layer (not shown) filled between the thin film transistor array substrate 150 and the color filter array; a plurality of balls 131 arranged on the thin film transistor array substrate 150; and a solid 132 to adhere the balls 131 to the thin film transistor array substrate 150.

The color filter array comprises a black matrix layer 201 formed in a non-pixel region on the second substrate 200; a color filter layer 202 formed on the second substrate 200 including the black matrix layer 201; an overcoat layer 203 formed over the entire surface of the second substrate 200 including the black matrix layer 201 and the color filter layer 202; and a hard coating layer 211 formed over the overcoat layer 203.

The color filter layer 202 and the overcoat layer 203 may be selectively omitted. The spacer 130 is arranged in a portion provided within the width of the black matrix layer 201 on the thin film transistor array substrate 150. That is, the spacer 130 is formed in the non-pixel region and fixed by means of a solid 132 for the purpose of preventing movement.

A second alignment film 204 to define initial alignment of liquid crystals is further formed on the hard coating layer 211, and a first alignment film (not shown) is further formed on the thin film transistor array substrate 150. The formation of the first and second alignment films is optional.

The hard coating layer 211 formed over the entire surface of the second substrate 200 has hardness equivalent or comparable to that of the ball 131. In the process of joining the thin film transistor substrate 150 to the second substrate 200 comprising the color filter array, when the spacer 130 comprising the ball 131 and the solid 132 faces the second alignment film 204 arranged on the hard coating layer 211, the hard coating layer 211 can prevent the ball 131 from being embedded in the second alignment film 204 as its hardness is comparable to that of the ball 131. That is, the ball-embedding phenomenon can be prevented.

Figure 6:
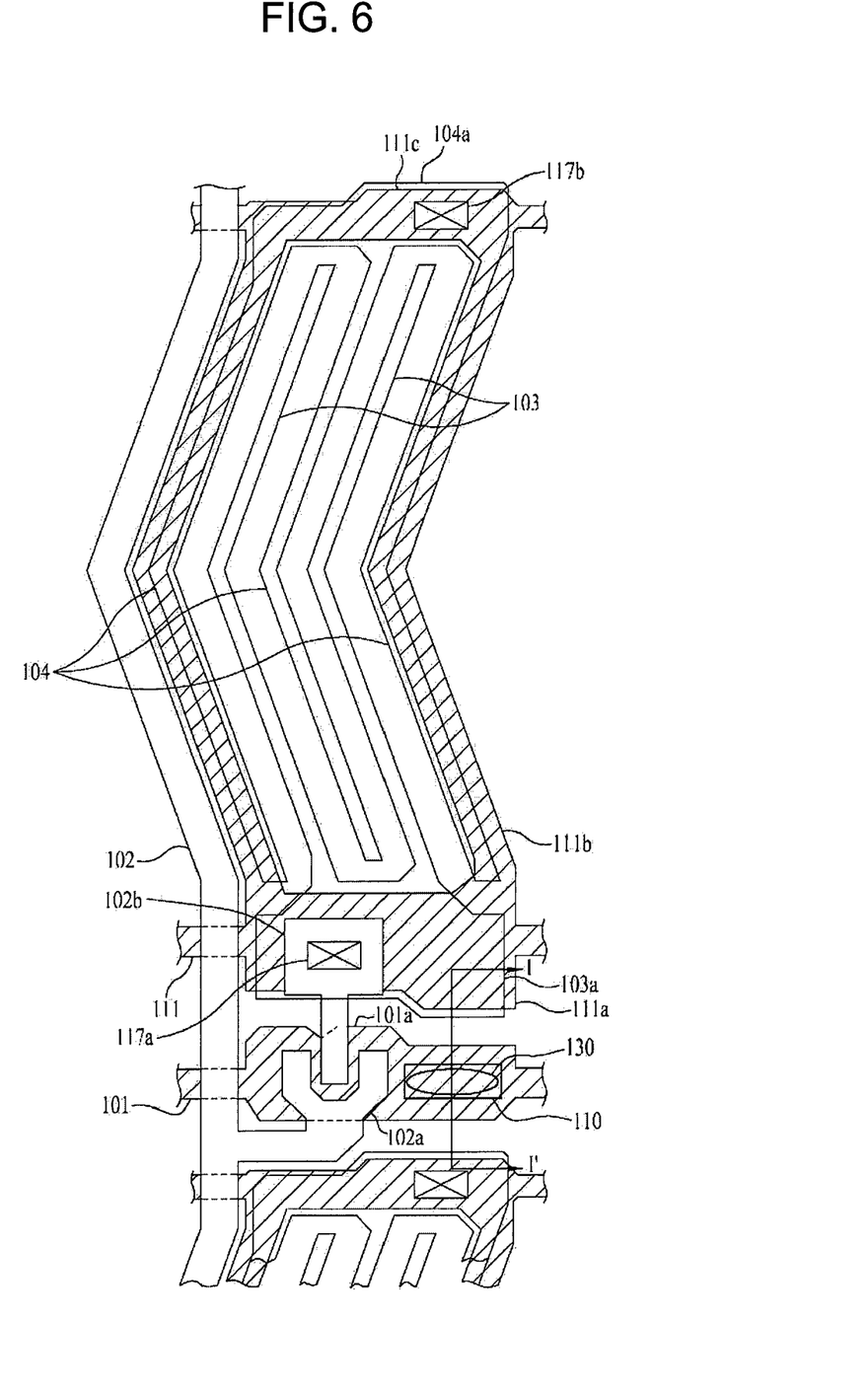
FIG. 6 is a plan view illustrating a liquid crystal display device according to an embodiment of the present invention.

Although not shown, the thin film transistor array substrate 150 comprises: a plurality of gate lines and a plurality of data lines that intersect each other to define pixel regions; a plurality of thin film transistors formed at respective intersections between the gate lines and the data lines; pixel electrodes and common electrodes alternately formed in the pixel regions; a gate insulating film formed between the gate line layer and the data line layer; and a passivation film formed between the data line and the pixel electrode (See FIG. 6). In this case, the liquid crystal is driven based on an in-plane electric field (horizontal field) applied between the pixel electrode and the common electrode. The thin film transistor is electrically connected to the pixel electrode.

If needed, the pixel electrode alone may be formed without the common electrode in the pixel region. In this case, a vertical electric field may be applied between the pixel electrode and the common electrode by forming the common electrode over the second substrate 200. In a case where the common electrode is made of a transparent electrode material such as indium tin oxide (ITO) or indium zinc oxide (IZO), the common electrode may be used as an alternative to the hard coating layer 211.

In addition, the thin film transistor array substrate 150 comprises the first substrate and the thin film transistor arranged thereon. In addition to the afore-mentioned configuration, the thin film transistor array may be modified into a variety of forms.

Meanwhile, the spacer 130 is formed in accordance with an ink-jetting method which is performed by jetting a spacer-forming material contained in an ink-jet head (not shown) in predetermined portions. The spacer-forming material comprises about 2 to about 20% by weight of a liquid thermosetting binder (in an uncured state of the solid 132), the solid 132 (in a cured final state of the liquid thermosetting binder) and the balls 131. In this regard, the balls 131 are not stacked in the form of a laminate, instead being spread over the color filter substrate 210 in the form of a monolayer. As shown in FIG. 4, the spacer 130 is composed of a single ball 131. Alternatively, the spacer 130 may be composed of a plurality of balls 131 arranged in a longitudinal direction. If necessary, as shown in the drawings, the balls 131 may be arranged in both horizontal and vertical directions in the one plane.

In the process of ink-jetting, the spacer-forming material comprising the balls for forming the spacer 130 is jetted in the corresponding region and then cured at about 80 to about 300° C. As a result, the thermosetting binder is cured and then solidified in the form of aggregates including the plurality of balls, while the solvent is volatilized.

The solid is an uncured form of the liquid thermosetting binder. For example, the solid includes at least one selected from acrylic-based, urethane-based and epoxy-based organic compounds, or a silicone-based compound. Specific examples of acrylic compounds include ethyl methacrylate, N-butyl methacrylate, isobutyl methacrylate, dicyclopentanyl methacrylate, benzyl methacrylate, glycidyl methacrylate, 2-hydroxyethyl methacrylate, methacrylic acid isobornyl methacrylate and styrene polymers, and combinations thereof.

The solvent is selected from those that have a boiling point of about 60 to about 300° C. For example, glycol ether may be used as the solvent. Examples of useful glycol ethers include propylene glycol methyl ether (PGME), dipropylene glycol methyl ether (DGME), tripropylene glycol methyl ether (TGME), propylene glycol methyl ether acetate (PGMEA), dipropylene glycol methyl ether acetate (DGMEA), propylene glycol n-propyl ether (PGPE), dipropylene glycol n-propyl ether (DGPE), propylene glycol n-butyl ether (PGBE), dipropylene glycol n-butyl ether (DGBE), tripropylene glycol n-butyl ether (TGBE), propylene glycol phenyl ether (PGPE), propylene glycol diacetate (PGD), dipropylene glycol dimethyl ether (DGDE), diethylene glycol ethyl ether (DGEE), diethylene glycol methyl ether (DGME), diethylene glycol n-butyl ether (DGBE), diethylene glycol hexyl ether (DGHE), diethylene glycol n-butyl ether acetate (DGBEA), ethylene glycol propyl ether (EGPE), ethylene glycol n-butyl ether (EGBE), ethylene glycol hexyl ether (EGHE), ethylene glycol n-butyl ether acetate (EGBEA), triethylene glycol methyl ether (TGME), triethylene glycol ethyl ether (TGEE), triethylene glycol n-butyl ether (TGBE), ethylene glycol phenyl ether (EGPE) and ethylene glycol n-butyl ether mixtures (EGBEM).

Preferably, the solvent has a surface tension of 20 to 80 dynes/cm, a viscosity of 1 to 30 cP and a density of 0.8 to 1.2 g/cc at ambient temperature. Based on these properties, the solvent is volatilized and removed during curing at about 80 to about 300° C.

In addition, the balls 131 are made of an organic compound e.g. divinylbenzene. The balls 131 can be distinguished from other ingredients, in that the balls are present in the form of a white powder, while the solid and the solvent are in a liquid state. If necessary, the balls 131 may be subjected to surface-treatment prior to being mixed into the spacer-forming material so that they can be distinguished from other liquid components.

The process for forming the spacer 130 will be illustrated below. The spacer-forming material comprising a plurality of balls and a mixed liquid material consisting of a liquid thermosetting binder and a solvent is ink-jetted and then heated. In the process of heating, the solvent is volatilized, and the liquid thermosetting binder is cured such that the balls are aggregated together and fixed on the first substrate, to form a solid. As a consequence, the spacer 130 is obtained.

In this case, the hard coating layer 211, which is formed on the second substrate 200 that faces the spacer 130, may be selectively formed only in a region where the spacer 130 is formed. As shown in the drawing, it is more preferable that the hard coating layer 211 be formed over the entire surface of the spacer 130 to reduce the number of masks to be used.

In addition, as illustrated above, by forming the hard coating layer 211 that has the same hardness as or a similar hardness to the ball 131, it is possible to prevent touch defects caused by the ball-embedding phenomenon. As a result, the liquid crystal margin can be increased from a level less than about 0.8% shown in FIG. 3 up to about 5.5%.

Hereinafter, a liquid crystal display device according to a second embodiment of the present invention will be illustrated with reference to the annexed drawings.

Figure 5:
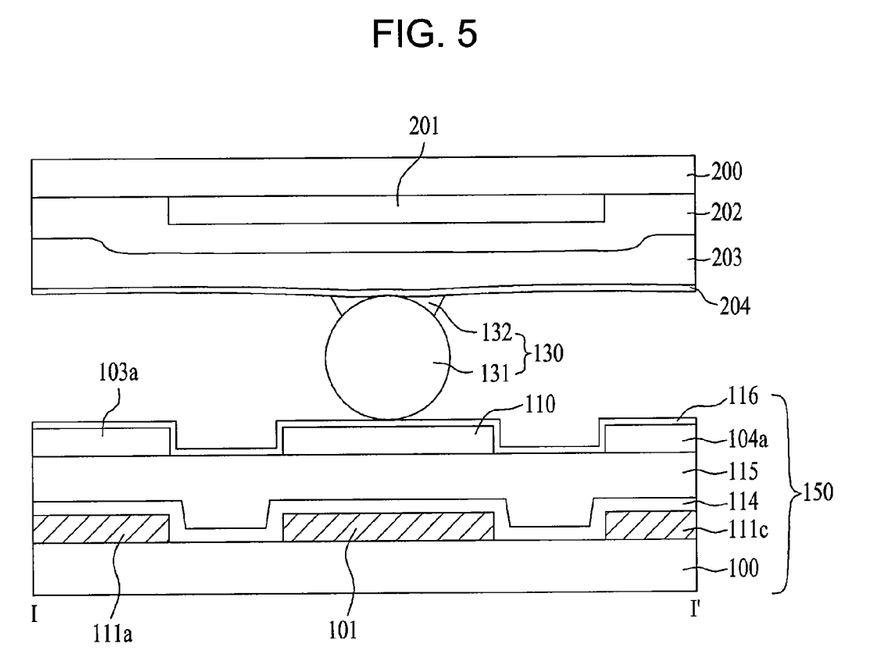
FIG. 5 is a sectional view illustrating a liquid crystal display device according to a second embodiment of the present invention.

FIG. 5 is a sectional view illustrating a liquid crystal display device according to the second embodiment of the present invention.

As shown in FIG. 5, the liquid crystal display device according to the second embodiment of the present invention comprises: a thin film transistor substrate 150 and a second substrate 200 comprising a color filter array that face each other; a liquid crystal layer (not shown) filled between the thin film transistor array substrate 150 and the color filter array; a ball 131 arranged on the color filter array; and a solid 132 to adhere the ball 131 to the color filter array.

The liquid crystal display device of the second embodiment is different from that of the first embodiment in that the spacer 130 comprising the ball 131 is formed on the second substrate 200. When the spacer 130 is formed on the second substrate 200, a hard coating pattern 110 is formed in a portion corresponding to the spacer 130 on the thin film transistor array substrate 150 that faces the spacer 130. That is, unlike the hard coating layer formed over the entire surface of the second substrate in the first embodiment, the hard coating pattern 110 is at the same level as a second storage electrode 103a or a common electrode connection pattern 104a made of a transparent electrode material adjacent thereto. That is, the hard coating pattern 110 is formed at the same level as the transparent electrode (e.g., pixel electrode) adjacent thereto to reduce the number of masks used for forming the same. In addition, the hard coating pattern 110 must be arranged as the uppermost layer of the thin film transistor array substrate 150 that directly comes in contact with the spacer 130 in order to minimize damage to the surface that faces the spacer 130.

The hard coating pattern 110 is arranged on the gate line 101 and has a length (in a longitudinal direction of the gate line 101) of about 60 to about 120 μm and a width of about 10 to about 30 μm. If needed, the second storage electrode 103a or the third common connection electrode 104a may be formed such that it overlaps the gate line 101. In these cases, the hard coating pattern 110 is formed such that it is spaced apart from the second storage electrode 103a and the third common connection electrode 104a.

The color filter array comprises a black matrix layer 201 formed in a non-pixel region on the second substrate 200; a color filter layer 202 formed on the second substrate 200 including the black matrix layer 201; and an overcoat layer 203 formed over the entire surface of the second substrate 200 including the black matrix layer 201 and the color filter layer 202.

A second alignment film 204 to define initial alignment of liquid crystals may be further formed on the overcoat layer 203, and a first alignment film 116 may be further formed over the entire surface of the top including the uppermost layer (the pixel electrode and the hard coating pattern 110) of the thin film transistor array substrate 150. The first and second alignment films 116 and 204 are optional. The first and second alignment films 116 and 204 have thicknesses smaller than the thicknesses (i.e., about 1,000□) of the pixel electrode and the hard coating pattern 110, thus being hardly affected by variations in thickness. Furthermore, the first and second alignment films 116 and 204 are completely baked prior to joining of both substrates, thus minimizing deformation caused by applied pressure. Accordingly, the surface variation of the first alignment film 116 that directly comes in contact with the spacer 130 is considered to be only slight and negligible.

The formation of the spacer 130 is performed in accordance with the ink-jetting method illustrated in the first embodiment, and constituent components of the spacer 130 are the same as in the first embodiment. Accordingly, a detailed explanation thereof is omitted.

Hereinafter, the structure provided on the first substrate will be described in detail with reference to the annexed drawings. The configuration of the first substrate is applicable to the first and second embodiments.

Figure 7:
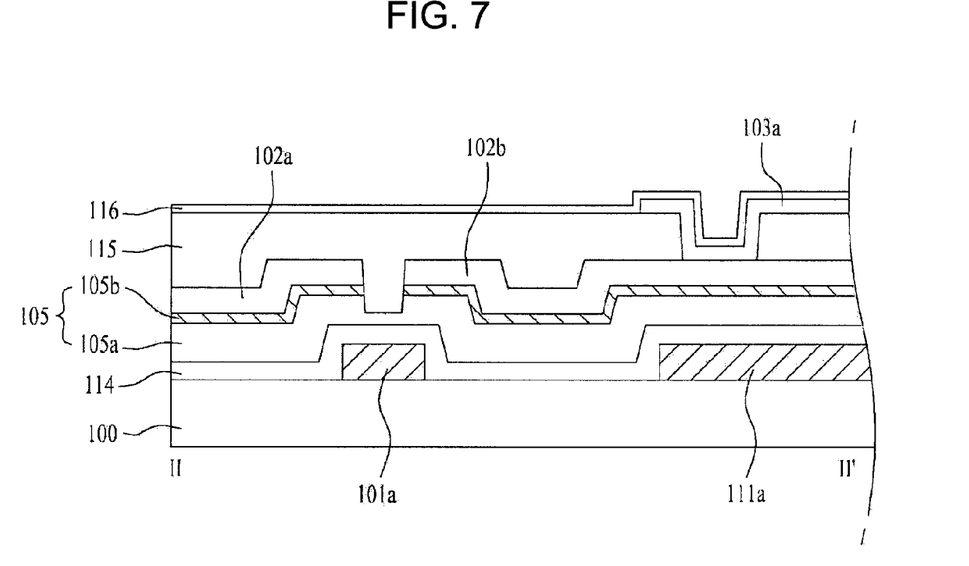
FIG. 7 is a sectional view illustrating the structure of the liquid crystal display device, taken along the line II-II' of FIG. 6.

FIG. 6 is a plan view illustrating a liquid crystal display device of the present invention. FIG. 7 is a sectional view taken along the line II-II' of FIG. 6.

A plurality of gate lines 101 and a plurality of data lines 102 are arranged on the first substrate 100, such that the gate lines 101 and the data lines 102 intersect each other, to define pixel regions. In addition, common lines 111 are arranged on the first substrate 100 such that the common lines extend in parallel to the gate lines 101.

In addition, thin film transistors are located at respective intersections of the data lines 101 and the gate lines 102. Each thin film transistor includes: a gate electrode 101a protruding from the associated gate line 101; a gate insulating film 114 formed over the entire surface of the first substrate 100 including the gate electrodes 101a, the gate lines 101 and the common lines 101; a "U"-shaped source electrode 102a and a drain electrode 102b arranged at both sides of the gate electrode 101a such that the drain electrode 102b is partially located in the "U"-shaped source electrode 102a; and semiconductor layers 105 (105a, 105b) arranged in regions including portions under the source electrode 102a and the drain electrode 102b, and channel portions between the source electrode 102a and the drain electrode 102b. The semiconductor layers 105 include an amorphous silicon layer 105a and an impurity semiconductor layer (n+ layer) 105b arranged thereon. The impurity semiconductor layer 105b is formed by removing the channel region present between the source electrode 102a and the drain electrode 102b. The shape of the source electrode 102a is not limited to the "U"-shape and may be "-"- or "L"-shaped.

The data line 102 has a central bent portion at each sub-pixel such that the data line 102 forms a zigzag line. The common line 111 is integrally formed with a storage electrode 111a at each pixel and the storage electrode 111a is connected to a common electrode connection electrode 111b which lies adjacent to both sides of the data line 102 and protrudes in parallel to the data line 102. As mentioned above, the data line 102 crosses the gate line 101 and has a bent portion at each pixel. Exemplary embodiments of the present invention are not limited thereto and the data line may perpendicularly cross the gate line, or may be tilted at a predetermined angle with respect to the gate line. In the illustrated drawings, the reason for imparting the bent portion to the data line 102 at each pixel is that the common electrode 104 and the pixel electrode 103 extend in parallel to the data line, and a vertically symmetrical electric field is thus generated, on the basis of the bent portion, which allows for orientation of liquid crystals in different directions and thus leads to an improvement in viewing angle.

The common electrode 104 and the pixel electrode 103 are made of transparent electrodes at the same level in pixel regions and have alternately arranged portions. The common electrode 104 is partially overlapped with the common electrode connection electrode 111b arranged therebeneath. A second common electrode connection electrode 111c which extends in parallel to the gate line 101 has, as an electrical contact, a second contact portion 117b which passes through the passivation film 115 and the gate insulating film 114 interposed between the common electrode 104 and the second common electrode connection electrode 111c.

In addition, the pixel electrode 103 is branched from the second storage electrode 103a overlapping the first storage electrode 111a, and has, as an electrical contact, a first contact portion 117a which passes through the passivation film 115 interposed between the pixel electrode 103 and the drain electrode 102b.

Hereinafter, a method for manufacturing the structure of the first substrate 100 including the thin film transistors, the common electrodes and the pixel electrodes will be illustrated in detail.

A metal such as Mo, Al or Cr is deposited on a first substrate 100 and is then patterned through photolithographic processes to simultaneously form a plurality of gate lines 101, gate electrodes 101a, common lines 111 extending parallel to the gate lines 101, first storage electrodes 111a integrally formed with the common lines 111, and first common electrodes 111b and second common electrodes 111c branched from the first storage electrodes 111a and protruded in pixel regions. At this time, the gate electrodes 101a are formed in predetermined positions provided by pixel regions such that they are protruded from the gate lines 201, and the first storage electrodes 111a, the first common connection electrodes 111b and the second common connection electrodes 111c are formed in the boundaries between adjacent pixel regions.

Then, an inorganic insulating material is deposited over the first substrate 100 provided with the gate lines 101, the common lines 111, the gate electrodes 101a, the first storage electrodes 111a, and the first and second common connection electrodes 111b and 111c, to form a gate insulating film 114.

Subsequently, an amorphous silicon layer 105a and an impurity semiconductor layer 105b are sequentially deposited on the gate insulating film 114.

A metal such as Mo, Al or Cr is deposited on the resulting structure and a photosensitive film is applied thereto. For example, the photosensitive film may be a negative photosensitive film.

The portions where the data lines, source electrodes and drain electrodes are formed define a light-transmission part, the channel portions of the semiconductor layers define a light-semi-transmission part, and the remaining portions defined a light-shielding part. In this regard, masks (not shown) defined as the light-shielding part are positioned on the photosensitive film.

Subsequently, the photosensitive film is exposed to light and is then developed through the masks, to form a first photosensitive film pattern such that the portions provided by the light-transmission part remain un-etched, the portions provided by the light-semi-transmission part are partially removed, and the portions provided by the light-shielding part are completely removed. The metal material is patterned using the first photosensitive film pattern (not shown) in accordance with photolithographic processes. The first photosensitive film pattern includes a first pattern which has a bent portion in each pixel region, while crossing the gate line 101, and a second pattern (corresponding to the light-transmission part where the source and drain electrodes are formed, including the light-semi-transmission part of the masks) which is connected to the first pattern at the intersection of the gate line 101 and extends toward the pixel region. After the patterning of the metal using the first photosensitive film pattern, data lines 102 which cross the gate lines 101 and have a bent portion at respective pixel regions are formed, and dummy patterns (not shown) connected to the data lines 102 are formed in portions corresponding to the second pattern.

Subsequently, the impurity semiconductor layer 105*b* and the amorphous silicon layer 105*a* are primarily selectively removed using the data lines 102 and the dummy patterns as masks.

Subsequently, with respect to the first photosensitive film pattern (not shown), the first photosensitive film pattern is subjected to ashing such that the photosensitive film provided by the light-semi-transmission part of the mask which has a relatively smaller thickness is removed, to form a second photosensitive film pattern (not shown).

Subsequently, the portions, where the metal material (located in the same layer as the data line 102) of the dummy pattern and the impurity semiconductor layer 105*b* are exposed, are selectively removed using the second photosensitive film pattern as a mask, to form source electrodes 102*a* and drain electrodes 102*b* and to pattern the impurity semiconductor layer 105*b* arranged thereunder. In this process, the impurity semiconductor layer 105*b* interposed between the source electrode 102*a* and the drain electrode 102*b* is removed. The removed region is defined as a channel portion. The source electrode 102*a* is formed in the "U" shape that protrudes from the data line 102 toward the pixel region. The drain electrode 102*b* is spaced apart from the source electrode 102*a* by a predetermined distance and is partially embedded in the "U" form of the source electrode 102*a*.

Subsequently, a passivation film 115 is deposited over the gate insulating film 114 provided with the data lines 102, the source electrodes 102*a* and the drain electrodes 102*b*. At this time, the passivation film 115 is generally made of an inorganic material e.g., $SiN_x$. In order to increase an aperture ratio of liquid crystal cells, low dielectric organic materials such as benzocyclobutene (BCB), spin on glass (SOG) and acryl may be used.

Subsequently, a portion of the passivation film 115 arranged on the drain electrode 102*b* is selectively etched to form a first contact portion 117*a*, and the passivation film 115 and the gate insulating film 114 provided in predetermined portions on the second common connection electrode 111*c* are selectively removed to form a second contact portion 117*b*.

Subsequently, a transparent electrode is deposited over the passivation film 115 including the first and second contact portions 117*a* and 117*b* and is then selectively removed, to form a plurality of common electrodes 104 which are partially overlapped with the common electrode connection electrodes 111*b* at respective pixels and spaced apart from one another, third common connection electrodes 104*a* overlapping the second common connection electrodes 111*c* and connecting the common electrodes 104 in pixel regions of the common electrodes 104, and a plurality of pixel electrodes 103 alternating with the common electrodes 104.

Subsequently, a first alignment film 116 is formed over the entire surface of the passivation film 115 including the pixel electrode 103 and the common electrodes 104.

Figure 8:
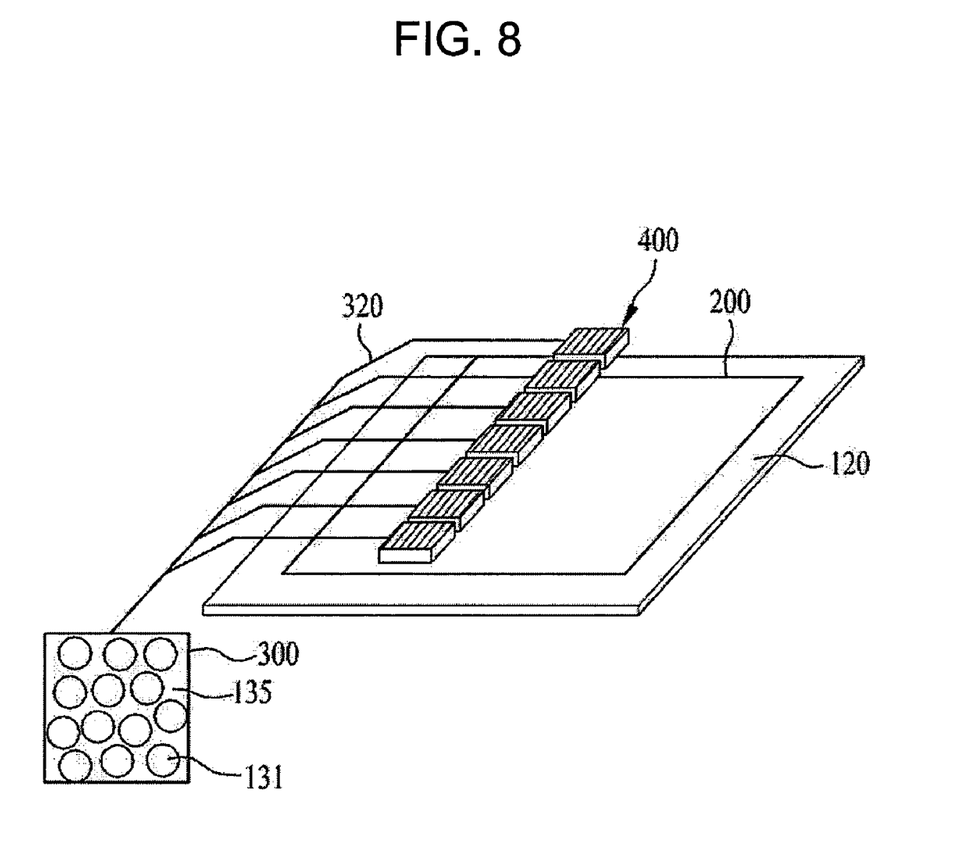
FIG. 8 is a schematic view illustrating an inkjet system for the formation of the spacer.

FIG. 8 is a schematic view illustrating an inkjet system used to form the spacers according to the present invention.

First, when a gas, e.g., nitrogen is injected into a supply tank 300 filled with a spacer-forming material wherein balls 131 are mixed with a liquid material 135 consisting of a liquid thermosetting binder and a solvent, the supply tank 300 undergoes an increase in internal pressure, which causes the spacer-forming material present in the supply tank 300 to be supplied through a pipe 320 into a plurality of inkjet heads 400.

The spacer-forming material supplied into the inkjet head 400 is sprayed through a nozzle (not shown) present inside the inkjet head 400 and is discharged in the predetermined portions of the second alignment film 204 (not shown in FIG. 10) arranged over the black matrix layer 201 (not shown in FIG. 10) on the second substrate 200. In this discharge process, since the spacer-forming material has slight spreadability and is oblate, it is cured through a heating process to form a spacer 130.

The pipe 320 is connected with a supply pipe (not shown) in the inkjet head 400. Thus, the spacer-forming material supplied via the pipe 320 flows through the supply pipe in the head 400. At this time, when a voltage applier 480 applies a voltage to a piezoelectric device (not shown), the piezoelectric device causes mechanical deformation, thus contracting the passage of the supply pipe and allowing the spacer-forming material to be discharged through the opposite nozzle (not shown).

At this time, at least one of the head 400 and a substrate stage 210 may be moved in a predetermined direction. Accordingly, when a large area of the second substrate 200 is provided, the second substrate 200 is divided into portions and ink-jet processes through the heads 400 provided in the ink-jet system are carried out in respective portions.

An example where the liquid crystal display device according to the present invention employs an in-plane switching (IPS) mode was illustrated with reference to the drawings. In the cases where the afore-mentioned spacer is applied to TN-mode liquid crystal display devices in which pixel electrodes are formed at respective pixels and common electrodes are further formed on the second substrate, it is possible to obtain the same effects as in the example.

The liquid crystal display device and the method for manufacturing the same have the following advantages.

First, since the spacers are made of balls with a small area in contact with the substrate that faces the spacers and a solid to adhere the balls to the substrate, they can reduce the frictional force due to the small area in contact with the substrate surface and allow two substrates, which are shifted upon touch operation, to rapidly return to their original states, thus preventing touch defects.

Second, the spacers are formed using a material comprising a solid to adhere the balls to the substrate surface where the spacers are to be formed, thus being not movable in the space between the two substrates, instead being fixed in the initial position, thereby preventing light leakage caused by movement of the balls.

Third, a hard coating layer or a hard coating pattern formed on the substrate surface that faces ball spacers functions to prevent problems (i.e., damage to the substrate surface that faces the spacers, and the ball spacer-embedding phenomenon) associated with the use of the ball spacers that are harder than organic or inorganic insulating films.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a first substrate and a second substrate facing each other;
   a gate line and a data line disposed on the first substrate such that the gate line and the data line intersect each other to define a pixel region;
   a thin film transistor disposed at an intersection between the gate line and the data line on the first substrate;
   a black matrix layer disposed on the second substrate in a portion corresponding to the gate line and the data line;
   a color filter array disposed on the second substrate including the black matrix layer;
   a spacer disposed on the color filter array in a predetermined portion provided within the black matrix layer, wherein the spacer comprises a plurality of balls and a solid to aggregate the balls together and adhere the balls to the color filter array;
   a pixel electrode electrically connected to the thin film transistor formed in the pixel region;
   a hard coating pattern disposed on the gate line facing the spacer, being separate from the pixel electrode, wherein the hard coating pattern and the pixel electrode are at the same layer; and
   a liquid crystal layer filled between the first substrate and the second substrate.

* * * * *